Aug. 3, 1943.  C. T. PHILLIPS  2,325,976
POULTRY FEEDER
Filed Dec. 8, 1941
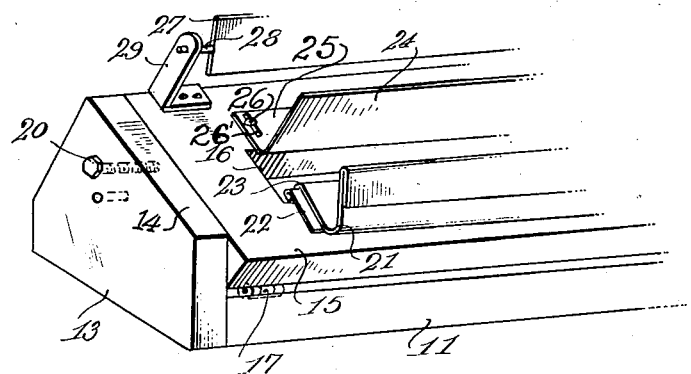
Fig. 1.
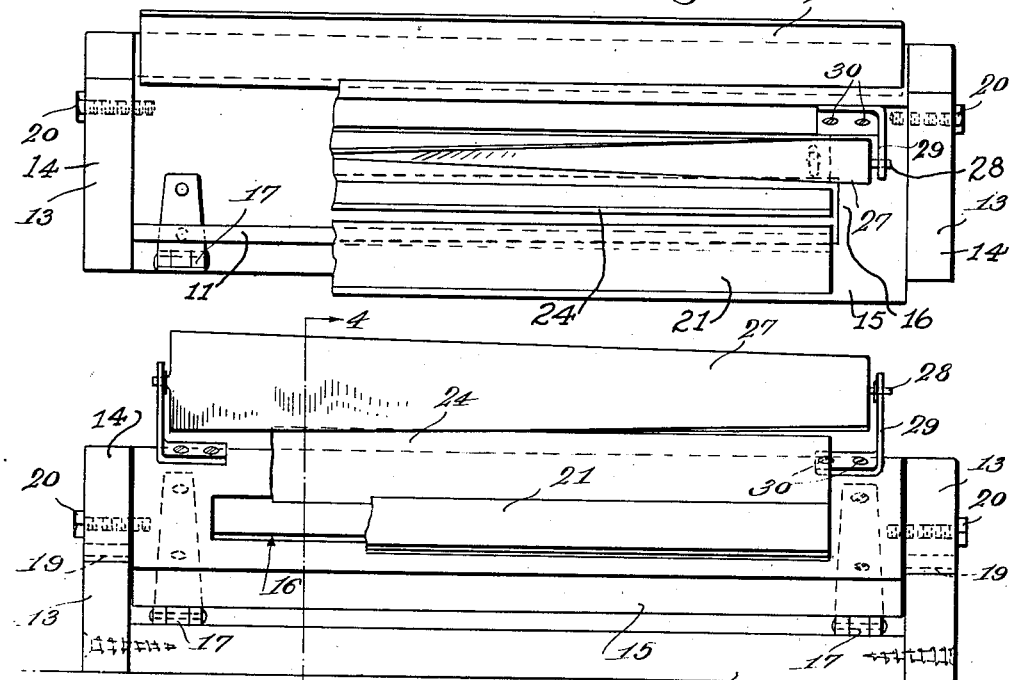
Fig. 2.
Fig. 3.
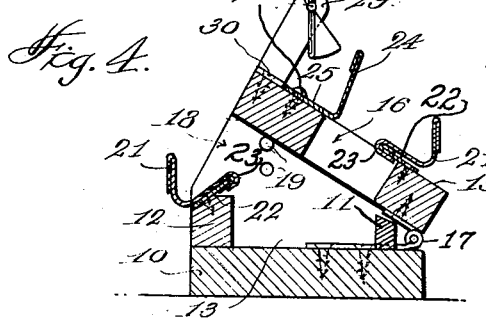
Fig. 4.
Fig. 5.
INVENTOR.
Clifford T. Phillips
BY
Victor J. Evans & Co.
ATTORNEYS Patented Aug. 3, 1943

2,325,976

UNITED STATES PATENT OFFICE 2,325,976

POULTRY FEEDER

Clifford T. Phillips, Red Hook, N. Y.

Application December 8, 1941, Serial No. 422,164

5 Claims. (Cl. 119—61)

This invention relates to a poultry feeder and has for an object to provide a poultry feeder having an opening in the lid for feeding purposes, there being a detachable retaining lip below the opening to catch feed that spills out of the feeder when poultry are feeding, the retaining lip also retaining surplus spilled food which may be subsequently eaten by the poultry.

A further object is to provide a poultry feeder having a guard over the top of the feed opening to prevent litter from dropping off the feet of the poultry into the trough like feed container.

A further object is to provide a poultry feeder having a spinner attached to the lid to keep poultry from roosting on the lid.

A further object is to provide a poultry feeder having a lid which may be adjusted vertically to accommodate poultry of various sizes.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a fragmentary detail view showing one end of a poultry feeder constructed in accordance with the invention.

Figure 2 is a top plan view of the poultry feeder with portions broken away.

Figure 3 is a front elevation of the poultry feeder.

Figure 4 is a cross sectional view of the poultry feeder taken on the line 4—4 of Figure 3.

Figure 5 is a detail perspective view of the retaining lip.

Referring now to the drawing in which like characters of reference designate similar parts in the various views, the poultry feeder comprises a trough like container 10 having a comparatively low front wall 11, a comparatively higher back wall 12 and a pair of end walls 13 of greater height than the back wall outside of the front and back walls and having downwardly and forwardly inclined top edges 14.

A lid 15 is disposed between the end walls 13 and inclines downwardly and forwardly. The lid is provided with a longitudinal feed opening 16, and is hinged at the bottom as shown at 17, to the front wall of the container. The lid has its upper rear edge spaced upwardly from the rear wall 12 of the container and this spacing of the lid provides a second feed opening 18, see Figure 4.

The end walls 13 of the container are provided with superposed openings 19 to interchangeably receive screw bolts 20 which are engaged underneath the upper free end of the lid to support the lid at various angular inclinations to the horizontal and thus vary the height of the said opening 18 to accommodate poultry of various sizes.

Both feed openings 16 and 18 extend longitudinally respectively of the lid of the container and are provided on their lower edges with identical retaining lips 21. As best shown in Figure 5 each retaining lip is of substantially V-form in vertical section and is removably held in place by a respective metal strip 22 secured to and extending above the lower walls of the feed openings, these strips receiving hook like flanges 23 formed on the retaining lips.

The lid is provided on its top and above the feed opening 16 with an angular guard 24 having a foot portion 25, provided with transverse slots 26', slidably mounted on the lid by screws 26.

The lid is also provided above its feed opening with a spinner 27 which is in the nature of an elongated metal strap twisted longitudinally and provided at the ends with gudgeons 28 which are received in angular bracket arms 29 which are secured by screws 30 to the lid.

The retaining lips 21 prevent spilled food from dropping to the ground and also retain the food to be subsequently eaten by the poultry. The guard 24 prevents debris from falling from the legs of the poultry into the food supply through the opening 16 in the lid. The spinner prevents poultry from roosting upon the lid.

From the above description it is thought that the construction and operation of the invention will be fully understood with out further explanation.

What is claimed is:

1. A poultry feeder comprising a trough like container, an inclined lid provided with a feed opening hinged at the lower edge to the container, end walls for the container, means carried by the end walls supporting the upper free end of the lid at various desired spaced distances above the container to provide an adjustable feed opening between the lid and the container, both of said feed openings extending longitudinally of the lid and the container, means provided at the lower edges of both feed openings preventing the wasting of food dropped by poultry while feeding and collecting the dropped food for subsequent eating by the poultry, a guard above the feed opening in the lid preventing debris from the feet of the poultry from dropping into the lid feed opening, and means carried by the lid preventing roosting of the poultry on the lid.

2. The structure of claim 1 in which the means for adjustably supporting the free end of the lid on the container comprises supporting members interchangeably engaged through openings in the side walls of the container and projecting from the side walls into contact with the underneath surface of the lid at the free end of the lid.

3. The structure of claim 1 in which the means for preventing waste of dropped food and at the same time collecting dropped food comprises retaining lips of substantially V-form in vertical section, metal straps secured to and extending above the lower walls of the feed openings and hook like flanges on the lips in which said metal straps are received.

4. The structure of claim 1 in which the means for preventing poultry roosting on the lid comprises a spinner formed of an elongated metal ribbon twisted axially and rotatably mounted on brackets on the end edge portions of the lid.

5. A poultry feeder, comprising a trough-like container, an inclined lid provided with a feed opening hinged at the lower edge to the container, end walls for the container, means carried by the end walls supporting the upper free end of the lid at various desired spaced distances above the container to provide an adjustable feed opening between the lid and the container, both of said feed openings extending longitudinally of the lid and the container, means provided at the lower edges of both feed openings for preventing the waste of food dropped by the poultry when feeding and collecting the dropped food for subsequent eating by the poultry, and a guard above the feed opening in the lid preventing debris from the feet of the poultry from dropping into the lid feed opening.

CLIFFORD T. PHILLIPS.